3,456,746
FLOW RESTRICTING AND METERING RADIAL
    BEARING FOR DRILLING TOOLS
Erskine P. Garrison, Long Beach, and John E. Tschirky,
  Manhattan Beach, Calif., assignors to Smith Industries
  International, Inc., Whittier, Calif., a corporaion of
  California
      Filed Dec. 12, 1967, Ser. No. 689,836
      Int. Cl. E21b 17/10, 5/00; E21c 15/00
U.S. Cl. 175—320                              7 Claims

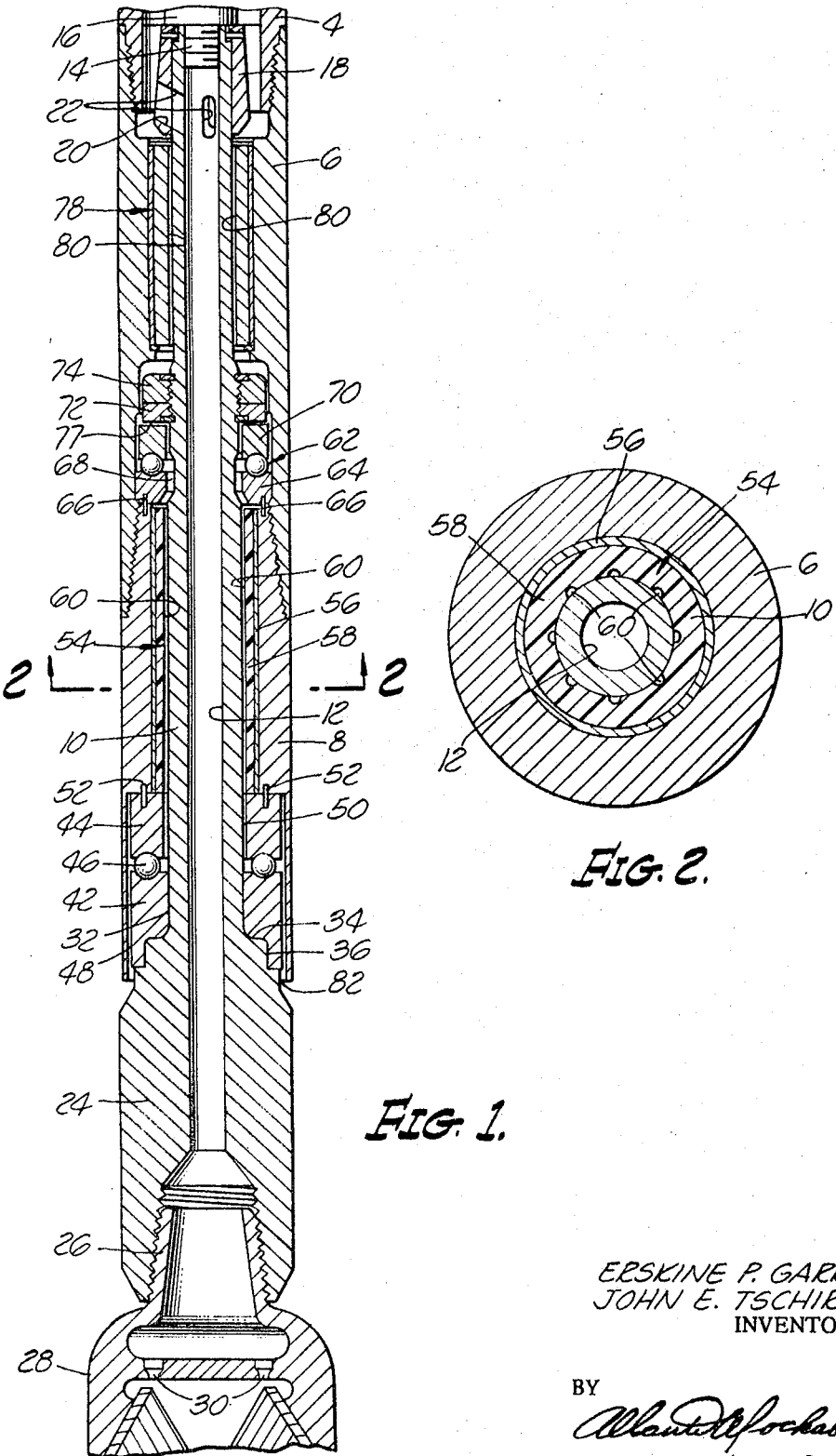

ABSTRACT OF THE DISCLOSURE

A drilling tool having a drill shaft supported for rotation in a tubular housing which may comprise the lower end of a drill pipe string wherein one or more thrust bearings are interposed between the tubular housing and the drill shaft to transmit friction relieving thrust from the tubular housing and the remainder of the drill string to which it is attached to the drill shaft, and wherein there is radial bearing means in the form of a sleeve between the tubular housing and the drill shaft above the thrust bearing, the radial bearing having drilling fluid passageways or grooves extending downwardly therein from top to bottom to convey drilling fluid from the drill string to the radial and thrust bearings, the drill shaft having a longitudinal fluid conveying passage therethrough to convey drilling fluid to outlet jets in a drill bit attachable to the lower end of the drill shaft, the radial bearings being of such length and their fluid conveying passageways or grooves being of such flow capacity that flow restriction is created, resulting in most of the drilling fluid being conveyed downwardly through the drill shaft, and but a small percentage of the fluid being conveyed downwardly through the radial bearing and thrust bearing and exhausted from the bottom of the tubular housing above the bottom of the drill shaft and bit.

---

This invention relates to a well drilling tool or assembly particularly adapted for use in connection with a rotary drill shaft in a tubular housing with bearing means between the shaft and the housing and means for providing an adequate but restricted flow of drilling fluid to and through the radial bearings as compared to the amount of fluid delivered downwardly through the drill shaft to the drill bit.

A conventional type of drilling tool includes a rotary drill shaft mounted in and extending from the bottom of a tubular housing, the latter generally comprising the bottom section of a string of drill pipe extending into the bottom of the hole from the surface. The weight of the string of drill pipe is transmitted to the drill shaft to assist in breaking up hard formations when the drill bit is rotated. To relieve the otherwise extreme frictional drag between the drill shaft and the housing or bottom section of drill pipe in the string, thrust bearings are provided between the housing and the drill shaft. In addition, radial bearings are interposed between the housing and the drill shaft to relieve friction due to lateral forces where the drill shaft extends upwardly into the tubular housing. Normally, the radial bearing, in the form of a sleeve, has been of a length no greater than or not greatly exceeding its diameter. Such a bearing furnishes sufficient bearing surface as a radial bearing. One of the objects of the present invention is to provide in a drilling assembly a radial bearing which is provided with longitudinal passageways from top to bottom, preferably in the form of grooves, which will convey drilling fluid from the drill pipe above it to thrust bearing means located below the radial bearing, wherein the length and cross sectional flow capacities of the passageways or grooves provide a flow restriction so that when the fluid has performed its function of lubricating and cooling of the bearings, it is exhausted from the bottom of the tubular housing above the lower end of the drill shaft, and above the bit, which is located on the bottom of the drill shaft. The restriction permits flow of only a very small percentage of the drilling fluid through the radial and thrust bearings, by far the greater percentage being conducted downwardly through a longitudinal bore in the drill shaft and directed downwardly into the bottom of the hole adjacent the drill cutters through jet orifices, in order to facilitate the operation of the drill bits.

In addition to providing a radial bearing with flow restricting passageways for the drilling fluid, we provide thrust bearing structure in combination with the restricted flow radial bearing which provides a flow passageway for the fluid from the bottom of the radial bearing through and about the elements of the thrust bearing and thence downwardly and outwardly from the bottom of the tubular housing above the bottom of the drill shaft.

The above and other objects will more fully appear from the following description in connection with the accompanying drawing:

FIG. 1 is a longitudinal sectional view through a drilling tool with an embodiment of the invention incorporated therein;

FIG. 2 is an enlarged transverse section taken approximately on the line 2—2 of FIG. 1.

In the drawing there is shown the bottom section 4 of a conventional drill pipe string. Threaded thereto and extending downwardly therefrom is an upper tubular housing section 6, and threaded to the bottom thereof and extending downwardly therefrom is a lower tubular housing section 8. The sections 6 and 8 are actually the bottom sections of the drill string but are of modified construction as compared to conventional sections of drilling pipe. Located in the tubular housing sections 6 and 8 is a rotary drill shaft 10 having a longitudinal bore 12 extending from the top to the bottom thereof. The upper end of the drill shaft 10 is threadedly connected to a threaded reduction 14 on the lower end of a drive element 16 which may be in turn driven by a suitable device, such as a Moyno pump. A conventional bonnet 18 is suitably mounted on the upper end of the drive shaft 10. The bonnet has drilling fluid inlet apertures 20 which mate with similar apertures 22 in the upper portion of the drive shaft to permit the flow of drilling fluid downwardly through the drill pipe section 4 and into the upper end of the drill shaft bore 12.

The lower end of the drill shaft is enlarged, as at 24, and is provided with a threaded coupling portion 26 to permit the connection of a drill bit 28, the latter having drilling fluid outlet jets 30 which direct fluid downwardly into the vicinity of drill bit cutters (not shown) as is well known in the art.

Ball races 42 and 44 retain a set of bearing balls 46 to provide an antifriction thrust bearing. The race 42 is shown closely fitting the drill shaft 10 at 32 and spaced from the tubular housing section 8 at 48. The ball race 42 follows the radius 34 at the beginning of the drill shaft enlargement 24. Also, the bottom of the ball race 42 closely fits a pair of parallel flatted portions 36 so the ball race will rotate positively with the drill shaft 10. The ball race 44 is spaced from the drive shaft 10 at 50. Preferably, the race 44 is secured to the tubular housing section 8 by suitable pins 52 so that it will remain stationary with the tubular housing section 8. Thus, lower race 42, rotating with the drill shaft 10, will rotate the bearing balls 46 and cause them to travel with the ball race 44 and uniformly distribute bearing wear.

Above the thrust bearing just described in a radial bearing 54 which preferably includes a brass sleeve 56 and a rubber or plastic tube 58 therein. The rubber or plastic is provided with longitudinal passageways or grooves 60 which extend lengthwise of the radial bearing 54 and provide means for conveying drilling fluid to the thrust bearing 42, 44, 46.

Above the radial bearing 54 in the tubular housing section 6, is a ball thrust bearing assembly, generally indicated at 62. Its lower race 64 is secured by pins 66 to the upper end of the lower tubular housing section 8 and is spaced from the drill shaft, as indicated at 68. The upper race 70 is spaced both from the tubular housing section 6 and the drill shaft 10, as illustrated so that drilling fluid will flow downwardly inside and outside of the race and through the remainder of the bearing. Race 70 is shown capable of slight axial movement in the same manner as race 42 is actually slidable in the lower thrust bearing assembly.

Above the bearing race 70 is a lock nut 72 and nut 74 which are adapted to transmit thrust from the hydraulic force acting on the rotating assembly above drive shaft 10 and downwardly directed to thrust bearing 62, to housing 8 and thus pulling on the entire drill pipe string 4. This is accomplished when the entire drilling tool assembly is raised and the bit is off-bottom and the mud circulating through the tool. Lock nut 72 and nut 74 are threaded to drive shaft 10 and will prevent bearing 46 and shaft 10 from being dropped and lost in the hole. When the bit is on the bottom of the hole as shown in FIG. 1, thrust bearing 46 is loaded. Thrust bearing 62 is then unloaded because of clearance 77 between race 70 and lock nut 72.

Above the last mentioned thrust bearing assembly is a second or upper radial bearing 78 similar in construction to the radial bearing 54 previously described. The radial bearing 78 is provided with longitudinal passageways or grooves 80 similar to the grooves 60 in the first described radial bearing.

Drilling fluid being pumped by fluid pumps downwardly through the drill pipe or string 4 to a great extent flows through the inlet apertures 20 and 22 in the bonnet and drill shaft respectively, and downwardly through the longitudinal bore 12 in said drill shaft to be jetted downwardy into the hole being drilled through the outlet jets 30. These jets assist in agitating fluid around the cutter in the bottom of the hole to assist in carrying off pieces of the formation which have been broken off by the cutters with the drilling fluid, which is then returned upwardly in the hole around the tubular housings 8 and 6 and the remainder of the drill string 4.

A small percentage of volume, say 3% to 20%, and preferably 6% to 10%, of the drilling fluid flows downwardly around the bonnet 18 and through the passageways 80 of the upper radial bearing 78. It then flows down around the nut 74 and lock nut 72, around and through the upper thrust bearing shown, and thence downwardly through the passageways or grooves 60 in the lower radial bearing 54. When it issues from the lower bearing passageways, it flows around and through the lower thrust bearing assembly, and is exhausted through a space 82 between the bottom end of the tubular housing section 8 and the upper end of the enlarged lower portion 24 of the drill shaft 10.

The specific percentage of drilling fluid which passes through the radial and thrust bearings and is exhausted into the hole above the bottom of the drill shaft is variable with the flow capacity of the fluid jets 30 in the drill bit 28. However, the fluid flow through these bearings is quite restricted because of the cross sectional areas of the passageways or grooves 60, 80 in the radial bearings 54, 78 and the lengths of said grooves. In other words, the cross sectional passageway area is a function of the length of the passageway, or for a given cross sectional passageway area, the fluid flow resistance is a function of the length of the passageway. Due to the viscosity of the drilling fluid, frictional drag will increase the restriction in a given passageway cross section when the length of the passage is increased. Consequently, even though there may be some variation in the flow ratios between the drill shaft bore or passage 12, and the radial bearing passageways due to difference in the sizes of the orifices 30 in the drill bit, the relatively small cross sectional areas of the passageways 60, combined with the length of the passageways, will maintain adequate restriction to prevent a large fluid outflow from the bottom of the tubular housing 8 at 82.

It will of course be understood that various changes can be made in the form, details, arrangement and specific proportions of the various parts, without departing from the spirit of the invention.

We claim:

1. A well drilling assembly including a normally upright drill bit shaft having a longitudinal bore with an upper inlet and a lower outlet for conducting drilling fluid downwardly therethrough under pressure, the lower end of said shaft having means for connecting with a drill bit having downwardly directed drilling fluid outlet jets, a tubular housing about said drill bit drive shaft and providing a conduit for supplying drilling fluid to the area of said drive shaft inlet and having a bottom outlet exteriorly of the drill shaft, thrust bearing means defining drilling mud flow conduits and located between the drill bit drive shaft and the tubular housing above said bottom outlet and positioned to transmit downward thrust from said tubular housing to said drive shaft, wherein the improvement comprises: a cylindrical fluid flow restricting and metering radial bearing unit disposed between said drill bit drive shaft and the interior of said tubular housing above and in drilling mud flow communication with the flow conduits defined by said thrust bearing, said radial bearing unit having passageway means from end to end providing drilling fluid flow communication from the tubular housing exterior of the drive shaft to the area of said thrust bearing, said radial bearing passageway means providing a drilling fluid flow restriction and metering device with a capacity less than that of said bore in said drive shaft.

2. The structure in claim 1, and the bottom outlet of said tubular housing being located above said means for connecting with a drill bit, and the drilling fluid flow restriction of said radial bearing passageway means being such as to lubricate and cool radial and thrust bearings and to assure that the major part of the fluid flow goes through the drive shaft and exits through the jets in the drilling bit to assure proper drilling.

3. The structure in claim 1, and said passageway means comprising a plurality of spaced grooves in the inner wall of the radial bearing, the grooves being of less width than the areas therebetween to provide substantial bearing surfaces between the grooves.

4. The structure in claim 1, and said passageway means having a flow capacity of the order of 3% to 20% of the total flow capacity of the downwardly directed outlet jets in a bit connected to said drive shaft.

5. The structure in claim 1, and said passageway means having a flow capacity of the order of 6% to 10% of that of the downwardly directed outlet jets in a bit connected to said drive shaft.

6. The structure in claim 1, and a second thrust bearing unit in said tubular housing about said drive shaft above said radial bearing, a second radial bearing in said tubular housing about said drive shaft above said second thrust bearing, said drive shaft drilling fluid upper inlet being disposed above said second radial bearing, the second radial bearing having drilling fluid passageway means from end to end providing drilling fluid flow communication from the tubular housing exteriorly of the drive shaft to the area of said second thrust bearing, and said second thrust bearing defining drilling fluid flow passageway means to the upper end of said first mentioned radial bearings.

7. The structure in claim 1, and the cross sectional area of said passageway means in said radial bearing being a function of the length of the passageway means.

References Cited

UNITED STATES PATENTS

| | | | |
|---|---|---|---|
| 2,990,894 | 7/1961 | Mitchell et al. | 175—107 |
| 3,022,837 | 2/1962 | Tibaspolsky | 175—107 |
| 3,260,318 | 7/1966 | Neilson et al. | 175—107 |
| 3,318,397 | 5/1967 | Combes | 175—107 |

JAMES A. LEPPINK, Primary Examiner

U.S. Cl. X.R.

175—107, 325